3,657,155
PRODUCTION OF ATTRITION RESISTANT SOLID CATALYSTS CONTAINING ANTIMONY OXIDE SUITABLE FOR USE IN A FLUIDIZED BED REACTION
Takachika Yoshino, Kanagawa, Shigeru Saito, Tokyo, and Yutaka Sasaki and Yoshimi Nakamura, Kanagawa, Japan, assignors to Nitto Chemical Industry Co., Ltd., Tokyo, Japan
No Drawing. Filed Aug. 5, 1969, Ser. No. 847,731
Claims priority, application Japan, Aug. 5, 1968, 43/54,952
Int. Cl. B01j 11/06, 11/32, 11/40
U.S. Cl. 252—456         31 Claims

ABSTRACT OF THE DISCLOSURE

Process for preparing an attrition resistant solid catalyst containing antimony oxide, suitable for use in a fluidized bed essentially comprising the heat treatment of a slurry containing an antimony compound, a ferric compound, a polyvalent metal compound and a silica sol.

BACKGROUND OF THE INVENTION (1) Field of the invention

The present invention relates to the production of solid catalysts containing antimony oxide an dhaving good mechanical strength. More particularly, it relates to a process for preparing a good, attrition resistant, solid catalyst containing antimony oxide, suitable for use in fluidized bed reactions.

DESCRIPTION OF THE PRIOR ART

It is well known to those skilled in the art that polyvalent metal oxide-antimony oxide system catalysts are useful for the oxidation of olefins to corresponding aldehydes or diolefins and for the ammoxidation of olefins to corresponding nitriles. For instance, iron (or cobalt or nickel)-antimony, uranium - antimony, tin - antimony, chromium (or copper, manganese or titanium)-antimony and manganese-antimony catalyst systems are known to be useful catalysts for the oxidation and ammoxidation of olefins, especially for the ammoxidation of propylene to acrylonitrile. Such catalysts are disclosed for example, in Japanese Pat. No. 42,264, U.S. Pat. No. 3,197,419, U.S. Pat. No. 3,198,750, U.S. Pat. No. 3,152,170, U.S. Pat. 3,200,081 and British Pat. No. 987,960.

It is desirable to calcine such catalysts for the purposes of the activation thereof at an elevated temperature of from about 400° C. to 1,000° C. in an oxidizing atmosphere, for example, in air. However, it has been found that such catalysts, when activated by this method, are extremely soft, possessing little strength. Further, it has also been found that the above defect cannot be overcome, even by the incorporation, prior to the high temperature calcination, of a catalyst carrier or support such as silica sol in the mass of starting materials from which the desired catalyst is to be prepared, since the resulting catalyst thus prepared still possesses little attrition resistance.

Methods to avoid the above-mentioned disadvantages have been proposed in the past. For example, in accordance with the teachinggs of British Pat. No. 1,018,334, the aforesaid disadvantages are considered to be caused by the lattice expansion of the catalyst components during the course of high temperature calcination, and are therefore believed to be effectively eliminated by employing a combination of two operational steps, that is, first pulverizing a catalyst which has previously been produced in accordance with any suitable catalyst preparation process including an activation at an elevated temperature, into a fine powder, and secondly, subjecting the catalyst, after reshaping by mixing the aforesaid fine powder with silica sol and drying the resulting mixture, to a final calcination. This combination of steps, however, is somewhat complicated, since the catalyst preparation step has to be repeated twice, which is very uneconomical. In addition to this, the degree of pulverization must be carefully controlled, since satisfactory mechanical strength varies depending on the degree of pulverization practiced.

On the other hand, British Pat. No. 1,045,789 teaches the foregoing defects to be inevitable irrespective of the process of preparing the catalyst, and in order to overcome such defects, proposes maintaining the particle sizes of finely powdered catalyst at a constant level during the reaction by causing the powdered catalyst introduced into a fluidized bed reactor to fluidize therein under the effect of a fluidizing gas stream having a high linear velocity between 40 and 130 cm./sec. However, this method does not directly improve the attrition resistance of the catalyst, but only maintains the particle sizes of the powdery catalyst in equilibrium at a constant level by repeated disintegration and reconstitution thereof in the fluidized bed. Accordingly, it may reasonably be concluded that the above procedure must always be executed within a reaction system in situ, resulting in the limitation that the reaction must be carried out under specific conditions with respect to the linear velocity of the fluidizing gas, viz., at a particularly high linear velocity, which causes large losses of the catalyst.

In accordance with the present invention, the above limitations are overcome, and it is possible to produce, in a single catalyst preparation process, a catalyst having a sufficient degree of attrition resistance to be used in a fluidized reactor. The results obtained by the process of this invention are surprising, since it has, up to now, been thought to be impossible to produce a catalyst containing antimony oxide free from fragility in a single catalyst preparation process.

SUMMARY OF THE INVENTION

The present invention provides a process for the preparation of an attrition resistant, solid catalyst containing antimony oxide, suitable for use in a fluidized bed reaction, which comprises the steps of preparing a slurry containing an antimony compound, a ferric compound, a polyvalent metal compound and silica sol as essential components, adjusting the pH of the slurry to a pH value below about 7, heat treating said slurry, subjecting the treated slurry to a conventional spray-drying operation to form substantially spherical particles, and calcining the resulting particles at a temperature of from about 400° C. to about 1,100° C.

DETAILED DESCRIPTION OF THE INVENTION

To produce the desired catalyst containing antimony oxide, a tri-valent antimony compound is used in preparing the slurry. The slurry thus prepared is also incorporated with a ferric compound and nitrate ion, the pH of the slurry is thereafter adjusted to a value below about 7 and, prior to the subsequent spray-drying operation, the slurry is subjected to heat treatment at a temperature of from about 40° C. to about 150° C. for at least 20 minutes, during which time it is still kept in the slurry state.

The catalyst to be prepared in accordance with this invention preferably comprises the combined oxides of the antimony and at least one of iron, cobalt, nickel, tin, uranium, chromium, copper, manganese, titanium, vanadium, molybdenum, tungsten, tellurium, bismuth, arsenic, thorium and cerium.

In one aspect of the invention, finely divided antimony trioxide, produced by subjecting antimony metal to an oxidation treatment with nitric acid and subsequently hydrolyzing the resulting product with boiling water or aqueous amomnia, may be employed as the trivalent antimony compound.

In a further aspect of the invention, a slurry, consisting essentially of a trivalent antimony compound, one or more polyvalent compounds, silica sol, a ferric compound and nitrate ion as essential components, are added with ammonium nitrate, in an amount of at least 1 percent by weight of the entire solid ingredients of the slurry, and thereafter the pH of the slurry is adjusted to a value below about 7.

In a still further aspect of the invention, a slurry consisting essentially of a trivalent antimony compound, one or more polyvalent metal compounds, silica sol, a ferric compound and nitrate ion as essential components is mixed with either nitrous acid or a nitrite, followed by pH adjustment to a value below about 7.

In other words, the essence of this invention lies in heating prior to the spray-drying of an above described slurry of particular compositions to a temperature of from about 40° C. to about 150° C., preferably from 80° C. to 100° C., for at least about 20 minutes, preferably within the range of from about 1 hour to about 12 hours, during which length of time each component forming the catalyst, inclusive of silica, reacts to form the fundamental framework which serves to impart attrition resistance to the final catalyst.

The process of this invention is widely adapted for a catalyst of the system: Sb-Me wherein Me represents at least one of the above polyvalent metal compounds, so far as there is employed, in the preparation of the catalyst, a ferric compound, preferably a compound which is able to liberate ferric ion in the slurry. The process is particularly adapted to the preparation of a catalyst of the system Sb-Fe. Other catalysts to which the present process is applicable are, for example, catalysts of the system: Sb-Me which has incorporated therein a small amount of iron solely or together with a small proportion of a promoter and catalysts of the system: Sb-Fe which may have incorporated therein, when necessary, a small proportion of a promoter. The atomic ratio of Me to Sb in catalysts of the preferred system can range from about 1:10 to about 5:1. However, optimum catalyst activity appears to be obtained at atomic ratios of Me to Sb within the range of from about 1:5 to about 1:1.

TRI-VALENT ANTIMONY COMPOUNDS

As starting materials for the tri-valent antimony compounds to be employed in accordance with the invention may be exemplified, such as antimony trioxide, nitric acid-oxidized antimony, antimony nitrate, basic antimony nitrate, antimony trihalide, antimony oxyhalide, hydrated antimony oxide containing tri-valent antimony [antimonic (III) acid], complex salts of antimony (III) oxide with an organic acid, and the like. Although the use of a tri-valent antimony compound is essential in this invention, it is not always necessary that the antimony compound to be used must contain only trivalent antimony. In other words, the above mentioned antimony compounds may contain, in part, penta-valent antimony. Accordingly, the use of antimony tetroxide, which is considered to be an equi-molecular admixture of antimony trioxide and antimony pentoxide, is permissible.

In a preferred embodiment of the invention, the foregoing compounds are in the form of fine particles dispersed in an aqueous medium, more preferably in the form of a colloid, or they can be present in a state similar to that of a solution.

As for the means by which the antimony compound is finely pulverized, there may be exemplified, in the case where nitric acid-oxidized antimony is employed, for example, mechanical grinding means, chemical size-reduction involving hydrolysis comprising the step of immersing the antimony oxide in water or aqueous ammonia (if it is effected at an elevated temperature, the rate or degree of pulverization thereof is increased), and the like.

The following will more fully illustrate the antimony compound starting materials to be used in accordance with the invention.

Nitric acid-oxidized antimony is obtained by oxidizing metallic antimony with nitric acid. It has been found that a large percentage, or substantially all of the antimony contained in this product is in the tri-valent state, irrespective of the nitric acid concentration or reaction temperature.

As for the purity of metallic antimony to be used, there are no particular limitations. It is desirable to avoid the contamination of the catalyst with elements which have an adverse influence on the catalytic activity, but this may be ignored if such elements as are present are those capable of forming water-soluble nitrates, because nitric acid-oxidized antimony is substantially water-insoluble and such water-soluble nitrate impurities may be easily separated by means of washing with water. A commercially available metallic antimony of high purity for industrial use may be used to accomplish the objects of the invention without further purification treatment.

Preferably, the metallic antimony employed is in the form of a powder, preferably a powder below about 100 microns in particle size. The use of massive or lumpy metallic antimony results in poor contact with the nitric acid, resulting in a lowered rate of oxidation, but is not always disadvantageous if means for improving the oxidation reaction are employed. One such means involves, for example, agitation during the course of oxidation so as to strip off the oxide film as it is produced on the surfaces of the lumps. The concentration of nitric acid to be used may be varied over a wide range, and can be determined practically, considering ease in operation and control of the rate of oxidation by the nitric acid.

Oxidation of metallic antimony with nitric acid is preferably effected either by slowly adding powdered metallic antimony to heated nitric acid or by heating a mixture of nitric acid and powdered metallic antimony. During the operation, it may be observed that a brown-colored gas is generated, and the end point of the reaction coincides with the ceasing of the generation of the gas. Whatever concentration of nitric acid is employed, and at whatever temperature the oxidation may be effected, substantially all of the antimony contained in the oxidation product has been found to be in the tri-valent state.

The antimony oxide thus obtained is washed with water to remove any unreacted nitric acid which may be present.

Immediately, or after removal of any free nitric acid present by washing with water, the nitric acid-oxidized antimony is preferably divided into fine particles by means of conventional mechanical or chemical means. Reduction in the particle size of the oxidized antimony allows the above mentioned heat treatment of slurry, which is a principal element of the invention, to be carried our rapidly and smoothly.

As mechanical grinding means, for example, there may be employed a conventional type of grinding or crushing device, such as a colloid mill, ball mill, vibration mill and the like. Besides such mechanical means, there may also be employed, for particle size reduction, a treatment comprising immersing the nitric acid-oxidized antimony in water. There is no particular limitation on the temperature of water which may be used. From an economical point of view the use of water at room temperature is preferred, but the water can be heated to a temperature above room temperature to promote reduction of particle size. To further promote such reduction it is preferred to use boiling water. The immersion operation can be carried out with or without continuous or, intermittent stirring or agitation. We have also found that the nitric acid-oxidized antimony can be finely divided by the immersion thereof in aqueous ammonia. In this case there is no particular limitation on the concentration of aqueous ammonia. The above statements with regard to temperature, stirring and other operational conditions apply to this treatment as well.

It is desirable to bring the particle size of the nitric acid-oxidized antimony below about 20 microns, whichever means may be employed. In case of water immersion, there is required a few hours immersion at room temperature, whereas a few minutes is sufficient in boiling water. The length of time required for accomplishing the reduction of particle size with aqueous ammonia as an immersion medium is several times less as when employing water. In either case the length of immersion time can be shortened by stirring. The combination of mechanical and chemical means may also be employed if desired.

It is desirable that the particle size of the nitric acid oxidized antimony be below about 20 microns, since the slurry heat treatment, which is a principal element of the invention and results in complicated reactions among the components, may be carried out more rapidly and smoothly with smaller particle sizes. However, the particle size of the nitric acid-oxidized antimony is not critical. It merely allows the slurry heat treatment to be carried out over a shorter period of time.

In cases where antimony trioxide is to be used as the source of antimony, the use of a commercially available antimony trioxide is desirable, as it is in the form of fine particles, viz, below 15 microns in particle size.

A commercially available antimony trioxide may be used without any further preliminary treatment. However, if desired, it may be subjected to a mechanical grinding process as in the case of the above-mentioned nitric acid-oxidized antimony. In this case, immersion in water or aqueous ammonia hardly contributes to the reduction of particle size.

Antimony trihalide, especially antimony trichloride, is also a very favorable starting material for the antimony source, from the standpoint of preparing a homogeneous slurry, because it can form a solution or suspension in which it is present as a very finely divided suspensoid when mixed with an aqueous medium containing hydrogen halide. During the course of the slurry heat treatment, antimony trihalide reacts with water in the slurry to produce antimony oxyhalide, which is converted into antimony trioxide or the hydrate thereof, and the antimony trioxide thus produced in the form of finely divided particles takes part in the somewhat complicated redox reactions with the other components of the catalyst.

It may reasonably be understood, for the same reasons as in the foregoing, that both antimony oxyhalide and antimony (III) oxide hydrate are suitable for use as starting materials.

Basic antimony nitrate and antimony nitrate are produced by treating metallic antimony with hot nitric acid and have a tendency to be gradually hydrolyzed into antimony trioxide when left standing in water for a long time. As will be understood from the foregoing description, therefore, they are also suited for use in the process of this invention.

Complex salts of antimony (III) oxide with an organic acid, such as antimony oxide tartrate complex and antimony oxide citrate complex, are also employable. In this case a portion of the organic acid component is removed during the slurry heat treatment, and the remainder is removed during the subsequent calcination step.

POLYVALENT METAL COMPOUNDS

As polyvalent metal compounds to be used in accordance with the present invention may be exemplified compounds of a polyvalent metal selected from the group consisting of iron, cobalt, nickel, tin, uranium, chromium, copper, manganese, titanium, vanadium, molybdenum, tungsten, tellurium, bismuth, arsenic, thorium and cerium. Preferably, these polyvalent metal compounds are either soluble in water or are such that at least a portion thereof becomes soluble in water by a heat treatment as described hereinafter.

The above-mentioned compounds may be used solely or in combination dependent upon the metals and the types of compounds. Where more than two compounds are used, at least one must be either soluble or partially soluble in water.

The particular polyvalent metal employed and the ratio of the metallic components in the catalyst compositions may be properly selected dependent upon the desired catalytic activity by those skilled in the art. However, according to another aspect of the present invention, the antimony-containing compositions so selected may be additionally compounded with further components to improve the physical properties of the catalyst. Such additional components may be particularly effective for preventing the formation of "stick" (a minute splinter material projectingly formed on the surface of catalyst) often encountered in the preparation of catalyst compositions in which the atomic ratio of the polyvalent metal to antimony is less than 1:2.

For example, Sb-Fe catalyst compositions and Sb-Fe catalyst compositions promoted by a small amount of V, Mo, W and/or a small amount of Te give excellent catalytic activity where the atomic ratio of Me:Sb is less than 1:1, in particular less than 1:2, wherein Me comprises Fe, V, Mo, W and Te. However, in such cases, said catalyst compositions are liable to form a "stick" in the preparation thereof, particularly in the process of final calcination. However, the "stick" formed on the surface of such catalyst compositions can be remarkably decreased or substantially eliminated by additionally compounding a small amount of another elemental component in the preparation of said catalyst compositions. In this case, copper or magnesium are particularly effective as a "stick" inhibitor and this result can be obtained while maintaining activity above the original catalyst activity, by additionally compounding 0.01 to 0.4, preferably 0.1 to 0.2 gram atom of Cu or Mg per 1 gram atom of Sb. Other antimony-polyvalent metal catalyst compositions, for example, Sb-U and Sb-Sn catalyst systems respond in substantially the same manner to such additions.

When employing a catalyst having "sticks" in fluid bed reactors the sticks are liable to be peeled off from the catalyst and scattered as viscous fine fragments to plug the outlet of the reaction vessel. Therefore, the composition and preparation of catalysts suitable for the reactions in fluid beds should be determined considering not only the activity but also the abrasion resistance and prevention of such "sticks".

"Sticks" have been found to form from antimony oxides independent of the kind of polyvalent metal employed in the antimony-containing catalyst system, and to prevent such "sticks," any metallic elements which, when mixed with an antimony oxide and the mixture calcined at 300 to 1000° C., can react with the antimony oxide have been found to be useful for the purpose.

These metallic elements include, in addition to the above polyvalent metals, alkali metals such as sodium and potassium, alkaline earth metals such as magnesium, calcium and barium, zinc, cadmium, aluminum, zirconium and lead. From the viewpoint of stick prevention, the identity and combination ratio of the above metallic elements are not particularly limited but should be properly selected substantially from the viewpoint of catalytic activity. The process for preparing a catalyst containing one or more of these metallic elements is contemplated within the scope of the present invention.

In the preparation of the attrition-resistant catalysts of the present invention, the polyvalent metal compounds do not present such serious problems as with the antimony compounds, since it is easy to choose a water-soluble compound from a number of polyvalent metal compounds, whence it follows that little trouble is encountered with respect to the uniform dispersion of the catalyst-forming ingredients in the slurry.

As starting materials for the iron, cobalt, nickel, uranium, chromium, copper, manganese, bismuth, thorium and cerium components, nitrates thereof, which are soluble in water and capable of providing nitrate ion, can conveniently be used. As starting materials for the vanadium component, there can conveniently be used such water-soluble compounds as ammonium metavanadate and vanadyl oxalate. As starting materials for the molybdenum and tungsten components, there can conveniently be used such water-soluble compounds as ammonium para(or meta) molybdate and ammonium para(or meta) tungstate. As starting materials for the titanium and tin components, there can preferably be used chlorides thereof, since they are partially water-soluble in an aqueous medium containing hydrochloric acid and can provide finely divided oxychlorides and oxide particles upon hydrolysis in the medium. As starting materials for the tellurium and arsenic components, there can be used any of their acids and oxides, such as, for example, telluric acid, tellurous acid, arsenic acid, arsenous acid; tellurium dioxide, arsenic trioxide, and arsenic pentoxide, the tellurium dioxide being used in the form of a solution comprising nitric acid which serves as an oxidizing agent and tellurium.

However, the invention is not in any way limited to the use of such compounds. In addition to the starting materials for each component as disclosed above, other water-soluble compounds may also be employed. In addition to this, even compounds which are slightly soluble in water can be used so long as it is possible to render it finely divided in an aqueous medium. As for the tin compounds, for example, there may be employed an oxidation product of metallic tin with nitric acid or tin oxides such as stannous oxide and stannic oxide. With regard to these compounds, substantially the same considerations as in the case of the foregoing nitric acid-oxidized antimony and antimony trioxide apply with respect to the pulverization thereof.

FERRIC COMPOUNDS AND NITRATE ION

For the slurry composition from which a catalyst is to be prepared in accordance with this invention, it is required that the slurry contain both a ferric compound, preferably one being capable of liberating ferric ions therein, and nitrate ions. This requirement may easily be satisfied by the use of ferric nitrate as the polyvalent metal compound, but compounds other than the ferric nitrate must be used in combination with a compound that is capable of yielding or liberating a ferric compound and/or nitrate ion, as the occasion demands.

As for the amount of nitrate ion in the slurry, it is necessary to employ nitrate ions in a proportion falling within the range from about 1 gram ion to about 2,000 gram ions per 100 gram atoms om antimony. Preferably, from about 50 gram ions to about 2,000 gram ions per 100 gram atoms of antimony are employed. Nitrate ions in a proportion smaller than the aforesaid lower limit to not give a satisfactory effect. Similarly, no significant change in effectiveness is attained with nitrate ions of a proportion greater than the aforesaid upper limit.

As for the amount of ferric compound in the slurry, the ferric compound must be present in an amount of at least 1 mole, preferably 5 moles or more, per 100 gram atoms of antimony. No significant effect is brought about with less than this amount ferric compound. The upper limit as to the proportion of a ferric compound to be used may be decided on the basis of the atomic ratio of iron to antimony (Fe/Sb) which is previously chosen taking the desired ferric compound content of the final catalyst into consideration.

The nitrate ion used in the process of the invention may be derived from many sources, for example, nitric acid-oxidized antimony, antimony nitrate, basic antimony nitrate and nitrates of polyvalent metals, as well as nitric acid.

As ferric compounds, there may be further exemplified soluble ferric salts, such as ferric sulfate, ferric hydroxide, and the like. The use of ferric nitrate satisfies the requirements of the coexistence of a ferric compound and nitrate ion.

It should be understood that the use of a ferrous compound as an iron source for preparing the slurry is also included within the scope of the invention, since the ferrous ions are oxidized, at least partially, into ferric ions by means of the nitrate ions in the slurry.

SILICA SOL

Concerning the preparation of the silica sol to be used in accordance with this invention, many known methods are available. However, it is convenient to employ one chosen from commercially available silica sols. The silica sol is used at a concentration, referring to the silica content in the silica sol, of from about 5% to about 90% on a weight basis. Slurries having a silica content lower than the above lower limit are inconvenient to handle because the concentration of the slurry is overly diluted. On the other hand, stability of the sol suffers with a slurry of silica content in excess of the above-described upper limit. Preferably, the silica content falls within a range from about 10% to about 50% by weight. Further, the amount of silica sol to be used ranges preferably from about 10% to about 90% when calculated as silica per 100 parts by weight of the final catalyst. When it is used in an amount below the lower limit described above, the final catalyst exhibits a reduced attrition resistance in many cases. When silica sol in excess of the above-described upper limit is used, the catalytic activity of the resulting catalyst often becomes lowered.

Should an aqueous silica sol be used, care should be taken so as to keep it from freezing prior to use. From an economical point of view it is preferred to use such an aqueous silica sol, so that when the invention is to be carried out in cold districts, the aqueous silica sol may have incorporated therein, for the purpose of preventing it from freezing during storage, one or more anti-freeze agents, such as, for example, lower alcohols such as methanol, ethanol, propanol and butanol, lower alkylene glycols such as ethylene glycol and propylene glycol, alkyl cellosolves such as methyl cellosolve and ethyl cellosolve, alone or together with water, to form a suspension or dispersion thereof.

The silica sols provide a silica component which serves to form a carrier or support of the final catalyst. The use of silica sol is essential to the invention. However, the silica sol may be, if desired, used in combination with one or more other carrier components such as silica in various forms other than a sol, such as silica gel and diatomaceous earth, alumina materials in the form of sols, gels or powders, zirconia, magnesia, beryllia and the like. In such cases, however, materials in a form other than a sol should preferably be finely divided.

SLURRY PREPARATION (MIXING AND pH-ADJUSTMENT)

In carrying out the process of the invention, a slurry is first prepared by mixing the aforesaid antimony (III) compound which may be in dry, wet, aqueous slurry or aqueous solution form, with the aforesaid polyvalent metal compound which may likewise be dry, wet, aqueous slurry or aqueous solution form, and the silica sol which includes, when the polyvalent metal compound is any other than ferric nitrate, one or more compounds which are capable of providing a ferric component and/or nitrate ions, together with water. Thus, both the ferric component and nitrate ions are present in the resulting slurry. For the purposes of this invention, it is only essential that the three components mentioned above must be admixed together during the time when the heat treatment is conducted.

The solids content of the slurry may preferably fall within the range from about 0.5% to about 50% on a weight basis as calculated in terms of the oxides of the elements which make up the catalyst. With a slurry of a solids content above the aforesaid upper limit, it becomes difficult to conduct the subsequent operations, especially the heat treating hereinafter described and the spray-drying due to its increased viscosity. The use of a slurry of a solids content below the aforesaid lower limit is disadvantageous from the viewpoint of economy, since a very large amount of water must be removed in the heat treating procedure.

Although the order in which the aforesaid three components are mixed is not critical, it is desirable from the standpoint of facility of operation and the uniform dispersion of each component that first a solution, second a colloid and finally a dispersion which is apt to precipitate are mixed with one another in that order. In a catalyst of the system: Sb-Fe-Si, for instance, to an aqueous solution of ferric nitrate there is first added a silica sol with stirring and finally either an antimony compound such as nitric acid oxidized antimony, antimony trioxide, etc. or an aqueous slurry comprising the antimony compound. However, the components may be mixed with one another in any order, if sufficient stirring is effected.

Each component may also be mixed with another one at a time. Alternatively, one or more components may first be mixed wholly or partially with respect to their proportion, the resulting mixture then subjected to a pH-adjustment to obtain the slurry hereinafter described, and the remaining components and the proportions of the aforesaid components may finally be added, during or after the completion of heat treating of the slurry, to produce the desired admixture to be again subjected to heat treatment.

Immediately before the heat treatment, a pH-adjustment is effected on the aforesaid slurry under stirring until a pH of below about 7, preferably within a range from about 1 to about 4, is obtained for the mixture. Any local increase in pH should be avoided during the pH adjustment.

As pH adjustment agents there may be used volatile acids and/or volatile bases. As volatile acids may be mentioned nitric acid, hydrohalogenic acids, various organic acids such as formic acid, oxalic acid, citric acid, tartaric acid and so on, carbon dioxide gas and aqueous carbonic acid. Among these acids, the most preferred is nitric acid. As volatile bases there may be exemplified gaseous or aqueous ammonia, organic amines, such as methylamine, ethylamine, methanolamine, ethanolamine, aniline, pyridines, quinolines and the like. Among these bases, the most preferred is gaseous or aqueous ammonia.

The slurry, which is to be subjected to the heat treatment, must be of high uniformity or homogeneity, so that the use of stirring is preferred in the slurry preparation procedure. This, however, amounts to no more than conventional technology and is not an essential element of the invention.

As stated hereinbefore, the co-existence of a ferric component and nitrate ions in the slurry is essential to the process of the invention, which contributes in no small measure both to the redox reaction between antimony and the polyvalent metal during the heat treatment and to the formation of such a foundational framework as to impart excellent attrition resistance to the final catalyst.

Although the instant invention is not applicable to catalysts which must be completely free of any iron component, the invention has a wide range of application, since a relatively small amount of iron serves favorably as a promoter in many cases, and at least does not have a bad influence on many types of catalysts containing antimony oxide for use in oxidation reactions.

HEAT TREATMENT PROCEDURE

The slurry as prepared above is then heated to a temperature of from about 40° C. to about 150° C., preferably from about 80° C. to about 100° C., for at least about 20 minutes, preferably from about 1 to about 12 hours. This heat treatment is one of the main characteristics of the invention, by which excellent attrition resistance is imparted to the finished catalyst.

It should be noted that the phenomena resulting from the heat treatment include not only mere temperature elevation of the slurry and vaporization of water therefrom but involves also very complex chemical reactions. In fact, there may be observed during the heat treatment at least some of the following: bubbling, viscosity increase, pH change and color change of the slurry; valence change from Sb (III) to Sb (V) and a particle size reduction with respect to at least a portion of the antimony compound; quantitative variations in the amount of free $Fe^{+++}$ ions; quantitative and qualitative variations in the silica particles remaining in the form of a sol; and the formation of nitrous acid. These phenomena indicate the fact that the antimony, polyvalent metal and silica contained in the slurry react with one another in a complicated manner in the presence of the ferric component and nitrate ions.

The lower-most limit as to temperature which may be employed in order to achieve the aforesaid objects of the invention are selected on the basis of the atomic ratio of iron to polyvalent metal to antimony to silicon in a slurry, the particular polyvalent metal employed, the kind of and degree of fineness of the antimony compound used, and the ratio of the number of nitrate ions to the number of antimony atoms present. Temperatures above about 40° C., however, result in the foregoing reactions taking place with the result that the objects of the invention are attained. Especially, at a temperature greater than about 80° C., it has been recognized that the effectiveness is more rapidly brought about and to a greater extent. Heat treatment at a temperature in the vicinity of the boiling point of the slurry, that is to say, about 100° C., is convenient from the standpoint of keeping the slurry at a constant temperature, and has the additional advantage that the slurry is effectively stirred by the boiling phenomenon above, which results in the objects of the invention being brought about rapidly and favorably.

Although heat treatment under pressure, which is carried out at a temperature above 100° C., is also effective, it is disadvantageous from an economical point of view, due to the expense of apparatus and operation.

So far as attrition resistance is concerned, heat treatment at a temperature in excess of about 150° C. does not afford any further advantage worth the high cost incurred.

The lower-most limit of time of heat treatment in order to achieve the aforesaid objects of the invention depends mainly on the temperature, but it is also somewhat affected by the other considerations discussed above with regard to temperature. Heating over a length of time of at least about 20 minutes, however, has been found to effectuate the foregoing reactions at least in part with the result that the objects of the invention are brought about. Preferably, the heating time ranges from about 1 hour to about 12 hours. In general, the foregoing reactions proceed more rapidly with a higher heating temperature, a larger atomic ratio of iron to antimony (Fe/Sb) and a higher degree of pulverization of antimony compound.

On the other hand, no substantially harmful effect appears, even if heat treatment is continued for a time far longer than the above-mentioned lower-most limit. For instance, no substantially harmful effect was observed when a slurry, whose appropriate heat treatment time is of the order of 1 hour, was heat treated for as long as 10 hours.

But an excessively long heat treatment may have an adverse influence on the attrition resistance of a finished catalyst, especially if it is carried out at a temperature of above 100° C. However, any adverse influence obtained is very slight so long as the heat treatment time does not exceed about 24 hours.

During the course of the heat treatment, complex reactions take place in the slurry causing a variation in the pH thereof. For instance, the pH of a slurry, previously adjusted to about 2 in the slurry prepartaion process, drops below 1 when heat trated at about 100° C. for about 2 hours. At this point there is no need to readjust the pH thereof to the initial value. However, if desired, it is possible to effect pH readjustment to some extent at this point.

The heat treatment can be effected either in an open type of apparatus, in which the slurry is concentrated, or in a closed type of apparatus in which water evaporating from the slurry is refluxed. Generally, the former is favorably applied to a diluted slurry, and the latter to a concentrated one. It should, of course, be mentioned that the former method is also applicable to a concentrated slurry with occasional addition of water to said concentrated slurry.

In either case, the heat treatment can be performed on a slurry of any concentration, so long as it remains in its slurry form. In any case, however, the heat treatment must not be continued until the slurry is evaporated to dryness.

AMMONIUM NITRATE AND NITROUS IONS IN A SLURRY

The effectiveness of the invention, that is, improvement of the attrition resistance of a catalyst will be brought about to a greater extent if ammonium nitrate is present in the slurry at the time when the slurry is heat treated. In a preferred embodiment of the invention a slurry contains both nitrate ions, from a polyvalent metal nitrate or added nitric acid, and ammonium, from aqueous ammonia used as a pH adjustment agent, so that there is no special need to incorporate ammonium nitrate in it. Of course, the effectiveness of the invention will also be sufficiently attained, with the production of a catalyst having an attrition resistance sufficient for practical use, even if no ammonium nitrate is present therein. Since the presence of ammonium nitrate in the slurry is favorable for the prepartaion of a catalyst of good attrition resistance and does not result in any harmful influence, even when it is additionally incorporated therein, however, it is very advantageous to additionally incorporate ammonium nitrate to the slurry, whether it contains both nitrate ions and ammonium ions or not.

Although the amount of ammonium nitrate to be additionally added is not critical, a preferred amount is in the range from about 1% to about 30% weight of the total solids content in the slurry. Although the role of the ammonium nitrate is not clear, it is believed that it has some effect upon the crystal grain rearrangement of the catalyst. The smaller the atomic ratio of polyvalent metal to antimony, the greater the effectiveness the ammonium nitrate has on the system.

If nitrous ions are present in the slurry, in addition to this, the reaction by whch a foundational framework of high attrition resistance is produced may be accelerated and it is possible to lower the heat treatement temperature and/or to shorten the heat treating time. By means of the complicated redox reactions which occur during the course of the aforesaid heat treatment, nitric acid or nitrate ions previously contained in the slurry are converted, at least partially, into nitrous acid or nitrous ions. Accordingly, it is not particularly necessary to separately add nitrous acid and/or a nitrite. However, the additional incorporation of nitrous acid and/or a nitrite to a slurry which already contains at least one of them is advantageous, since it results in no harmful effect and gives rather good results, especially when the slurry contains a relatively small amount of nitric acid or nitrous ions. As nitrites to be used, ammonium nitrite is most preferred. Other nitrites are also usable so long as the cations thereof do not adversely affect the catalytic activity of the finished catalyst.

As for the amount of a nitrite to be added, there is no restriction so long as it is of the type which is removed upon thermal decomposition. It is determined, therefore, on the basis of economical considerations only.

OTHER PROCEDURES

After the above-mentioned heat treatment procedure, the slurry is spray-dried so as to be shaped in the form of substantially spherical particles of very small dimensions.

Any prior art spray-drying means, such as, for example, pressurized nozzle and rotary-disk types of spray-dryers can be utilized. The solid content of a slurry to be subjected to spray-drying is preferably in the range from about 10% to about 40% by weight when calculated as oxides of the elements which make up a final catalyst. However, the foregoing range is not critical. A solids content below about 10% will do if a certain amount of economical disadvantage may be endured, and a solids content above about 40% will also do if slight inconvenience of operations is allowable.

It is very convenient from the viewpoint of simplicity of operation to spray-dry a slurry immediately after the heat treatment thereof, but it is not essential. The spray-drying may also be carried out after a relatively long time after the heat treatment. Also, it may be executed after the slurry is conditioned with respect to its solid content, either by dilution with water or by concentration through reheating. Although it is preferred from the standpoint of homogeneity of the resulting catalyst to completely mix each component of the slurry prior to its spray-drying by means of a homogenizer, the use of a homogenizer is not always necessary, so long as both the heat treatment and the subsequent optional adjustment of slurry concentration are executed with sufficient stirring.

The atmosphere in which spray-drying is carried out is not critical, but the employment of a non-reducing atmosphere is preferred. In the interest of economy, a fuel combustion gas containing an excessive amount of air is preferably used, but a stream containing oxygen in more or less concentration may also be employed.

For fluidized bed use, there may be preferably used a catalyst, 80 weight percent or more of which ranges from about 5 to about 100 microns in particle size, However, the primary object of the invention, that is, to increase the attrition resistance of a catalyst, can be achieved, irrespective of the size distribution of catalyst particles.

After the completion of spray-drying, the finely divided catalyst is immediately calcined, either after standing for a suitable length of time, or after being further subjected to drying at a temperature between about 200° C. and 400° C. The calcination temperature may range from about 400° C. to about 1,100° C.

Calcination can be effected either step-wise, viz, in two steps, a pre-calcination followed by a final calcination, or by means of a single-stage calcination. When a high temperature calcination, for example, calcination at an elevated temperature greater than 700° C., is desired the foregoing step-wise method is preferred. In this case, pre-calcination is preferably carried out at a temperature from about 350° C. to about 600° C.

The atmosphere in which calcination is carried out is not critical, but the employment of a non-reducing atmosphere is preferred. In the interest of economy, an air stream is preferably used, but a stream containing oxygen in more or less concentration than that of air may also be used.

Any of the types of heating means which are generally known in the art may be employed for the calcination.

Classified as to the states of catalysts to be processed, for instance, there are exemplified the following:

Stationary type: Electric furnace of the box type, electric furnace of the tunnel type, muffle furnace of the hot blast heating type, etc.
Movable type: Various kinds of rotary furnaces of the internal or external heating type using electric energy or fuel gas
Fluidized bed type: Heating furnaces of the fluidized bed type, employing the internal or external heating using electric energy or fuel gas.
Others: High frequency furnace When a stationary type of furnace is used, a catalyst may show a tendency to "caking," especially when the temperature is in excess of 700° C. It is therefore preferred to calcine the catalyst in as thin a layer as possible. This is considered to be favorable both from the standpoint of sufficient contact of the catalyst with the heated atmosphere and of the uniform calcination temperature of the entire catalyst.

When a movable type of furnace is used, in which spontaneous stirring, agitation or circulation of the catalyst takes place, the above is not a problem. In order to uniformly calcine the catalyst throughout the entire body thereof, however, due regard has to be paid to the operation of furnace and the state of contact of catalyst with the heating surface.

Fluidized bed heating is the most preferred method, when judged from all viewpoints, namely, prevention of caking, contact of the catalyst with the heated atmosphere and uniform heating of the catalyst. Since a catalyst immediately after spray-drying is still of poor mechanical strength in many cases, however, it is preferred to limit the linear velocity of the gas stream by which the catalyst is fluidized to no more than about 40 cm./sec. In this case, it may be advisable to preliminarily calcine the catalyst using another type of furnace, such as a stationary or movable type, and to finally calcine using the fluidized bed type of furnace. Thus, the resulting catalyst achieves a mechanical strength sufficient to endure more severe operational conditions, that is, extremely high linear velocities of the gas stream. Heating in a fluidized bed, however, can be executed satisfactorily, when a gas stream having a linear velocity equal to or somewhat greater than that at which fluidization of a catalyst begins (that is, generally, of the order of several centimeters per second) is used. Accordingly, there is no need of using a gas stream having an extremely high linear velocity, and therefore the heating in a fluidized bed is useful both in pre-calcination and final calcination.

Both the movable and fluidized types of furnaces can be either of the internal heating type, being provided with a heating element arranged internally or means through which a hot gas is introduced, or of the external heating type, which is heated only over the outer portion.

Pre-calcination and final calcination may be carried out (1) in one furnace such that the former is carried out first and then the latter at a higher temperature in the same zone of the furnace, or such that the former is carried out in a first zone and the latter in a second zone as in a tunnel furnace or rotary furnace, (2) in a series of the same type of furnaces such that the former is carried out in one or more furnaces and the latter in the others, or (3) in a plurality of various types of furnaces.

The above also applies to drying-pre-calcination and drying-pre-calcination-final calcination.

In addition, high frequency heating, which has recently been used in various fields, is also usable, either solely or in combination with any of the foregoing.

The invention will now be more clearly illustrated by the following examples together with controls which have been taken for comparison in accordance with prior art methods of preparing catalysts.

EXAMPLE 1

A catalyst for fluidized bed use and having the empirical formula: $Fe_{10}Sb_{25}Si_{30}O_{125}$, which being inclusive the carrier material (unless otherwise noted, all empirical formulas referred to hereinafter include the carrier), was prepared as follows:

(I) To 17.5 liters of nitric acid (specific gravity: 1.38) heated at about 80° C. there was slowly added 4.72 kg. of powdery metallic antimony below 100 microns in particle size. After complete oxidation of the antimony, excessive nitric acid was removed, and the resulting product was washed with water and ground in a ball mill for 3 hours.

(II) To a mixture of 6.25 liters of nitric acid (specific gravity: 1.38) and 7.75 liters of water heated to about 80° C., there was added slowly 0.865 kg. of electrolytic iron powder. The resulting mixture was left standing until the iron dissolved completely.

(III) There was provided 13.9 kg. of a silica sol having a silica content of 20% by weight (commercially available as "Snow Tex O" from Nissan Chem. Industries Co., Ltd.)

Products (I), (II and III) were mixed with one another and small increments of 15 wt. percent aqueous ammonia were added while stirring, to adjust the pH of the mixture to 2.0. (In the following description "pH of the conditioned slurry" is meant to indicate the pH following such treatment.)

The slurry thus obtained was heated at 100° C. for 2 hours while stirring, which resulted in an increase in the viscosity thereof and homogenization.

The slurry was then adjusted to a solids concentration of about 20% by weight of the oxides of the elements which make up the catalyst (in the following description, the term "slurry concentration" is used to mean the solid content, by weight, calculated as oxides of the elements contained in the slurry, as in this example), and spray-dried using a rotary disk type of spray-drying apparatus.

Micro-spherical particles obtained by the above procedure were heated in a rotary furnace of the external heating type to a final temperature of 650° C. over a period of about 3 hours, and then calcined at 850° C. for 2 hours in an electric furnace, to obtain the desired catalyst, more than 90% of which are within a particle size range of from 20 to 105 microns, and having a mean weight diameter of 59 microns.

EXAMPLE 2

A catalyst for fluidized bed use and having the empirical formula $Fe_{10}Sb_{25}Si_{30}O_{125}$ was prepared by repeating the procedures of Example 1, with the exception that the slurry was heated at 80° C. for 8 hours.

EXAMPLE 3

A catalyst for fluidized bed use and having the empirical formula $Fe_{10}Sb_{25}Si_{30}O_{125}$ was prepared by repeating the procedures of Example 1, with the exception that the the pH of the slurry was adjusted to 4.0 at the time of slurry preparation.

EXAMPLE 4

A catalyst for fluidized bed use and having the empirical formula $Fe_{10}Sb_{25}Si_{30}O_{125}$ was prepared by repeating the procedures of Example 1, with the exception that there was used a silica hol having a silica content of 30% by weight (commercially available as "LUDOX HS" from Du Pont Co., Ltd.).

EXAMPLE 5

A catalyst for fluidized bed use and having the empirical formula $Fe_{10}Sb_{25}Si_{30}O_{125}$ was prepared by repeating the procedures of Example 1, with the exception that the antimony material used was produced by washing the nitric acid-oxidized antimony product of Example 1 with water, immersing the same in 15 wt. percent ammonia under stirring and further washing the resulting product with water.

EXAMPLE 6

A catalyst for fluidized bed use and having the empirical formula $Fe_{10}Sb_{25}Si_{30}O_{125}$ was prepared as follows:

(I) There was provided 5.65 kg. of powdery antimony trioxide of below 20 microns in particle size.
(II) To a mixture of 6.25 liters of nitric acid (specific gravity: 1.38) and 7.75 liters of water, heated at about 80° C., there was slowly added 0.865 kg. of electrolytic iron powder, and this mixture was left standing until the iron dissolved completely.
(III) As the silica material there was provided 13.9 kg. of a silica sol having a silica content of 20% by weight (commercially available as "Snow Tex 20" from Nissan Chem. Industries Co., Ltd.).

Products (I), (II) and (III) were mixed with one another, and small increments of 15 wt. percent aqueous ammonia were added while stirring to adjust the pH of the mixture to 2.5.

The slurry thus obtained was heated at 100° C. for 2 hours while stirring, which resulted in an increase in the viscosity thereof and homogenization.

The slurry was then adjusted to a solids content of about 18% by weight and spray-dried using a spray-drying apparatus of the rotary disk type.

Micro spherical particles obtained by the above procedure were heated in a rotary furnace at 600° C. for 2 hours, and then calcined in a fluidized bed heater at 850° C. for 3 hours.

EXAMPLE 7

A catalyst for fluidized bed use and having the empirical formula: $Fe_{10}Sb_{25}Si_{30}O_{125}$ was prepared as follows:

(I) There was provided 5.65 kg. of commercially available powdered antimony trioxide having a particle size below 20 microns.
(II) There was also provided 0.865 kg. of electrolytic iron powder, which was slowly added into a mixture of 6.25 liters of nitric acid (specific gravity: 1.38) and 7.75 liters of water heated to about 80° C. and left to stand until the iron dissolved completely.
(III) There was further provided 13.9 kg. of a silica sol having a silica content of 20% by weight (commercially available as "Snow Tex O").

Products (I), (II) and (III) were mixed together while stirring and 15 wt. percent aqueous ammonia was slowly added to adjust the pH of the mixture to 2.5.

The slurry thus prepared was charged to an autoclave and heated at 130° C. for 30 minutes while stirring.

After withdrawing the slurry from the autoclave, it was spray-dried using a rotary disk type of spray drying apparatus.

Micro spherical particles obtained by the above procedure were heated in a rotary furnace of the external heating type at 600° C. for 2 hours, and then calcined in an electric furnace at 830° C. for 2 hours.

EXAMPLE 8

A catalyst for fluidized bed use and having the empirical formula $Fe_{10}Sb_{25}Si_{30}O_{125}$ was prepared as in Example 6 with the exception that, prior to conditioning of the slurry, powdered ammonium nitrate was added to it in a proportion of 0.1 kg. for every kg. of antimony trioxide present in the slurry.

EXAMPLE 9

A catalyst for fluidized bed use and having the empirical formula $Fe_{10}Sb_{25}Si_{30}O_{125}$ was prepared as follows:

(I) To 17.5 liters of nitric acid (specific gravity: 1.38) heated to about 80° C. there was slowly added 4.72 kg. of powdery metallic antimony below 100 microns in particle size. After completion of the oxidation of the antimony, excessive nitric acid was removed therefrom to obtain a nitric acid-oxidized antimony product which was then washed with water and pulverized in a colloid mill for 3 hours.
(II) To a mixture composed of 6.25 liters of nitric acid (specific gravity: 1.38) and 7.75 litres of water heated to about 80° C. there was slowly added 0.865 kg. electrolytic iron powder and the mixture was allowed to stand until the iron dissolved completely.
(III) There was provided 13.9 kg. of a silica sol having a silica content of 20% by weight( commercially available as "Snow Tex O"). Products (I), (II) and (III) were mixed with one another and to the mixture was added 1 kg. of 5 wt. percent aqueous nitrous acid and 15 wt. percent aqueous ammonia in small increments while stirring until the pH of the mixture reached 2.0.

The slurry thus prepared was heated at 50° C. for 16 hours while stirring, followed by spray-drying.

Micro spherical particles thus obtained were calcined in an external heating type rotary furnace at 650° C. for 2 hours, and further calcined in an electric furnace at 830° C. for 2 hours.

EXAMPLE 10

A catalyst for fluidized bed use and having the empirical formula $Fe_{10}Sb_{14}Si_{20}O_{83}$ was prepared as follows::

(I) To 9.8 liters of nitric acid (specific gravity: 1.38) heated to about 80° C. there was slowly added 2.64 kg. of powdery metallic antimony having a particle size below 100 microns. After completion of the oxidation of the antimony, excessive nitric acid was removed from the system and the resulting antimony oxidation product was washed with water and ground in a ball mill for 3 hours.
(II) To a mixture composed of 6.25 liters of nitric acid (specific gravity: 1.38) and 7.75 liters of water heated to about 80° C. there was slowly added 0.95 kg. of electrolytic iron powder, and the resulting mixture was left standing until the iron powder dissolved completely.
(III) 9.30 kg. of a silica sol having a silica content of 20% by weight (commercially available as "Snow Tex O") was provided.

Products (I), (II) and (III) were mixed with one another and 15 wt. percent aqueous ammonia was added with stirring so as to adjust the pH of the mixture to 2.0.

The slurry thus prepared was heated at 70° C. for 20 hours under agitation. After adjusting the solids content thereof to a value of 20% by weight, it was spray-dried.

Micro spherical thus obtained were calcined in an external heating type rotary furnace at 650° C. for 2 hours, and further calcined in an electric furnace at 830° C. for 2 hours.

EXAMPLE 11

A catalyst for fluidized bed use and having the empirical formula $Fe_{10}Sb_{60}Si_{100}O_{335}$ was prepared as follows:

(I) To 21 liters of nitric acid (specific gravity: 1.38) heated to about 80° C. there was added slowly 5.65 kg. of powdery metallic antimony below 100 microns in particle size. After the completion of oxidation of the antimony the excessive nitric acid still remaining was removed and the resulting product was washed with water and ground in a ball mill for 3 hours.
(II) To a mixture composed of 3.12 liters of nitric acid (specfic gravity: 1.38) and 3.88 liters of water heated to about 80° C. there was slowly added 0.432 kg. of electrolytic iron powder, the resulting mixture being left to stand until the iron powder dissolved therein completely.

(III) There was provided 23.2 kg. of a silica sol having a silica content of 20% by weight (commercially available as "Snow Tex O").

Products (I), (II) and (III) were mixed with one another and there was slowly added, while stirring, 15 wt. percent aqueous ammonia so as to adjust the pH of the mixture to 2.0.

The slurry thus prepared was heated at 100° C. for 4 hours while stirring, followed by drying, using spray drying apparatus.

Micro spherical particles thus obtained were calcined in an external heating type rotary furnace at 650° C. for 2 hours, and further calcined in an electric furnace at 800° C. for 2 hours.

EXAMPLE 12

A catalyst for fluidized bed use and having the empirical formula $U_{10}Fe_2Sb_{40}Si_{50}O_{209.6}$ was prepared as follows:

(I) To 7.2 liters of nitric acid (specific gravity: 1.38) heated to about 80° C. there was added slowly 1.95 kg. of powdery metallic antimony below 100 microns in particle size, and the resulting mixture was left standing until the antimony oxidized completely. After removing excessive nitric acid still remaining the resulting product was washed three times with 2 liters of water, and ground in a ball mill for 3 hours.
(II) Into 5 liters of water there was dissolved 2.0 kg. of uranium nitrate $[UO_2(NO_3)_2 \cdot 6H_2O]$.
(III) To a mixture of 400 ml. of nitric acid (specific gravity: 1.38) and 500 ml. of water heated to about 80° C. there was slowly added 45 g. of electrolytic iron powder, the resulting mixture being left standing until the iron powder dissolved therein completely.
(IV) 6 kg. of silica sol having a silica content of 20% by weight ("Snow Tex O") was provided.

Products (I), (II), (III) and IV were mixed with one another, and to the mixture was slowly added 15 wt. percent aqueous ammonia while stirring to adjust the mixture's pH to 2.0.

The slurry thus prepared was heated at 100° C. for 5 hours while stirring, and then subjected to spray-drying.

Micro spherical particles thus obtained were heated at 200° C. for 4 hours, then at 400° C. for 4 hours and finally at 800° C. for 4 hours to effect calcination.

EXAMPLE 13

A catalyst for fluidized bed use and having the empirical formula $Sn_{10}Fe_6Sb_{60}Si_{100}O_{349}$ was prepared as follows:
(I) To 10 liters of nitric acid (specific gravity: 1.38) heated to about 80° C. there were added slowly 0.317 kg. of powdery metallic tin below 100 microns in particle size and 1.95 kg. of powdery metallic antimony below 100 microns in particle size. After the completion of oxidation of the powdery tin and antimony, excessive nitric acid still remaining was removed and the resulting product was washed with water and ground in a ball mill for 2 hours.
(II) To a mixture composed of 700 ml. of nitric acid (specific gravity: 1.38) and 500 ml. of water heated to about 80° C. there was added slowly 89.4 g. of electrolytic iron powder, the resulting mixture being allowed to stand until the iron powder dissolved therein completely.
(III) There was provided 8.02 kg. of a silica sol having a silica content of 20% by weight ("Snow Tex O").

Products (I), (II) and (III) were mixed with one another, and to the mixture was slowly added, while stirring, 28% aqueous ammonia, so as to adjust the pH of the mixture to 2.5.

The slurry thus prepared was heated at 100° C. for 4 hours while stirring, and then subjected to spray-drying.

Micro spherical particles thus obtained were heated gradually to a final temperature of 800° C. for about 6 hours, using an external heating type rotary furnace for the calcination.

EXAMPLE 14

A catalyst for fluidized bed use and having the empirical formula $Cr_{16}Fe_1Sb_{25}Si_{30}O_{126.5}$ was prepared as follows:

(I) There was taken 2.33 kg. of powdery antimony trioxide below 20 microns in particle size.
(II) To a mixture composed of 300 ml. of nitric acid (specific gravity: 1.38) and 400 ml. of water heated to about 80° C., there was slowly added 36 g. of electrolytic iron powder, the resulting mixture being left to stand until the iron powder dissolved completely.
(III) Into 5 liters of water there was dissolved 2.56 kg. of chromic nitrate $[Cr(NO_3)_3 \cdot 9H_2O]$.
(IV) There was provided 5.77 kg. of a silica sol having a silica content of 20% by weight ("Snow Tex O").

Products (I)–(IV) were mixed with one another, and to the mixture was slowly added 15 wt. percent aqueous ammonia under stirring, so as to adjust the pH of the mixture to 2.5.

The slurry thus prepared was heated at 100° C. for 8 hours while stirring, followed by spray-drying.

Micro spherical particles of very small dimensions, thus obtained, were heated at 200° C. for 2 hours, then at 400° C. for 2 hours, thereafter at 600° C. for 2 hours and finally at 850° C. for 2 hours, respectively, for calcination.

EXAMPLE 15

A catalyst for fluidized bed use and having the empirical formula $Mn_{10}Fe_{0.8}Sb_{25}Si_{30}O_{131.2}$ was prepared as follows:

(I) There was provided 2.33 kg. of powder, antimony trioxide below 20 microns in particle size.
(II) To a mixture composed of 200 ml. of nitric acid of a specific gravity of 1.38 and 300 ml. of water heated to 80° C. there was added slowly 28.6 g. of electrolytic iron powder, the resulting mixture being left to stand until the iron powder dissolved therein completely.
(III) In 5 liters of water there was dissolved 1.84 kg. of manganese nitrate $[Mn(NO_3)_2 \cdot 6H_2O]$.
(IV) There was provided 5.77 kg. of a silicon sol having a silica content of 20% by weight ("Snow Tex O").

Products (I)–(IV) were mixed with one another, and to the mixture was slowly added 15 wt. percent aqueous ammonia while stirring so as to adjust the pH of the mixture to 2.0.

The slurry thus prepared was heated at 100° C. for 8 hours while stirring, followed by spray-drying.

Micro spherical particles thus obtained were heated at 200° C. for 2 hours, then at 400° C. for 2 hours, thereafter at 600° C. for 2 hours and finally at 850° C. for 2 hours, respectively, for calcination.

EXAMPLE 16

A catalyst for fluidized bed use and having the empirical formula $Cu_{10}Fe_2Sb_{50}Si_{60}O_{233}$ was prepared as follows:
(I) To 7.2 liters of nitric acid having a specific gravity of 1.38 and heated to about 80° C. there was added slowly 1.95 kg. of powdery metallic antimony below 100 microns in particle size. After the completion of the oxidation of the antimony, excessive nitric acid was removed to produce a nitric acid-oxidized antimony product which was then washed five times with 2 liters of water.
(II) 774 g. of cupric nitrate $[Cu(NO_3)_2 \cdot 6H_2O]$ was dissolved in 5 liters of water.
(III) To a mixture composed of 400 ml. of nitric acid (specific gravity: 1.38) and 500 ml. of water heated to about 80° C. there was slowly added 35.8 g. of electrolytic iron powder, the resulting mixture being left standing until dissolution of the iron powder was complete.
(IV) There was provided 5.77 kg. of a silica sol having a silica content of 20% by weight ("Snow Tex O").

Products (I)–(IV) were mixed with one another and to the mixture was slowly added 15 wt. percent aqueous ammonia while stirring, so as to adjust the pH of the mixture to 4.0.

The slurry thus prepared was heated at 100° C. for 5 hours while stirring, and then subjected to spray-drying.

Micro spherical particles thus obtained were heated first to 200° C. for 2 hours, then to 400° C. for additional 2 hours and finally to 800° C. for an additional 2 hours, respectively, for calcination.

EXAMPLE 17

A catalyst for fluidized bed use and having the empirical formula $V_{10}Fe_2Sb_{50}Si_{60}O_{248}$ was prepared as follows:

(I) To 7.2 liters of nitric acid (specific gravity: 1.38) heated to about 80° C. there was slowly added 1.95 kg. of powderly metallic antimony below 100 microns in particle size. After the completion of the oxidation of the antimony, excessive nitric acid was removed. The resulting product was then washed five times with 2 liters of water and pulverized in a ball mill over a length of time of 3 hours.
(II) 0.375 kg. of ammonia metavanadate was suspended in 5 liters of water.
(III) To a mixture of 400 ml. of nitric acid (specific gravity: 1.38) and 500 ml. of water heated to about 80° C. there was slowly added 36 g. of electrolytic iron powder and the resulting mixture was allowed to stand until the iron powder dissolved completely.
(IV) 5.77 kg. of a silica sol having a silica content of 20% by weight ("Snow Tex O") was provided.

Products (I)–(IV) were mixed together and to the mixture was slowly added, under agitation, 15 wt. percent aqueous ammonia, so as to adujst the pH of the mixture to 3.0.

The slurry thus prepared was heated at 100° C. for 5 hours while stirring and then subjected to spray-drying.

Micro spherical particles thus obtained were heated to 200° C. for 2 hours, then to 400° C. for 2 hours and finally to 830° C. for 2 hours, respectively, for calcination.

EXAMPLE 18

A catalyst for fluidized bed use and having the empirical formula $W_{0.25}Te_{1.0}Fe_{10}Sb_{25}Si_{30}O_{127.8}$ was prepared as follows:

(I) To 7.2 liters of nitric acid (specific gravity: 1.38) heated to about 80° C. there was slowly added 1.95 kg. of powdery metallic antimony below 100 microns in particle size. After the completion of the oxidation of the antimony, excessive nitric acid was removed. The resulting product was washed five times with 2 liters of water and pulverized in a ball mill for 3 hours.
(II) To a mixture composed of 3 liters of nitric acid (specific gravity: 1.38) and 4 liters of water heated to about 80° C. there was added slowly 0.358 kg. of electrolytic iron powder, the resulting mixture being left standing for the complete dissolution of the iron powder.
(III) 41.8 g. of ammonium tungstate was dissolved in 1.5 liters of water.
(IV) 147 g. of telluric acid was dissolved in 1 liter of water.
(V) 3.84 kg. of a silica sol having a silica content of 30% by weight (Du Pont "Ludox HS") was provided as the silica material.

Products (I)–(V) were mixed together and to the mixture was slowly added 15 wt. percent aqueous ammonia while stirring to adjust the pH of the mixture to 2.0.

The slurry thus prepared was heated at 100° C. for 4 hours while stirring and then subjected to spray drying.

Micro spherical particles thus obtained in finely divided form were heated to 200° C. for 4 hours, then to 400° C. for 4 hours and to 830° C. for 4 hours, respectively, for calcination.

EXAMPLE 19

A catalyst for fluidized bed use and having the empirical formula $W_{0.5}P_{1.0}Fe_{10}Sb_{14}Si_{20}O_{87}$ was prepared as follows:

(I Powdery antimony trioxide below 20 microns in particle size was provided in the amount of 2.33 kg.
(II) To a mixture composed of 6 liters of nitric acid (specific gravity: 1.38) and 8 liters of water heated to about 80° C. there was slowly added to 0.639 kg. of electrolytic iron powder, the resulting mixture being left standing until the iron powder was dissolved completely.
(III) 149 g. of ammonium tungstate was dissolved in 2 liters of water.
(IV) 132 g. of 85 wt. percent phosphoric acid was provided.
(V) 6.87 kg. of a silica sol having a silica content of 20% by weight ("Snow Tex O") was provided.

Products (I)–(V) were mixed together, and to the mixture was slowly added, while stirring, 15 wt. percent aqueous ammonia, so as to adjust the pH of the mixture to 2.0.

The slurry thus prepared was heated at 100° C. for 4 hours while stirring, followed by spray-drying.

Microspherical particles thus obtained were heated, first at 200° C. for 2 hours, then at 400° C. for additional 2 hours and finally at 830° C. for additional 2 hours, for calcination thereof.

Control 1

A catalyst for fluidized bed use and having the empirical formula $Fe_{10}Sb_{25}Si_{30}O_{125}$ was prepared as follows:

(I) To 17.5 liters of nitric acid (specific gravity: 1.38) heated to about 80° C. there was slowly added 4.72 kg. of powdery metallic antimony below 100 microns in particle size. After the completion of oxidation of the antimony, excessive nitric acid still remaining was removed to obtain a nitric acid-oxidized antimony product which was ground in a ball mill for 3 hours.
(II) To a mixture composed of 6.25 liters of nitric acid (specific gravity: 1.38) and 7.75 liters of water heated to about 80° C. there was slowly added 0.865 kg. of electrolytic iron powder, the resulting mixture being then allowed to stand until the iron powder was dissolved completely.
(III) 13.9 kg. of a silica sol having a silica content of 20% by weight ("Snow Tex O") was produced.

Products (I)–(III) were mixed together, and to the mixture was slowly added 15 wt. percent aqueous ammonia while stirring to adjust the pH of the mixture to 2.0.

The slurry thus prepared was treated three times with a homogenizer for uniform dispersion of the components.

The slurry was then spray-dried without being subjected to any prior heat treatment, using the rotary disk type of spray-drying apparatus.

Micro spherical particles thus obtained were gradually heated in an external heating type rotary furnace to a final temperature of 650° C. over about 3 hours, and then in an electric furnace at 850° C. for 2 hours.

21

This control was executed in the same manner as in Example 1, except that no heat treatment of the slurry was performed and that treatment by means of a homogenizer was performed for rendering the slurry homogeneous.

Control 2

A catalyst for a fluidized bed use and having the empirical formula $Fe_{10}Sb_{25}Si_{30}O_{125}$ was prepared by the same procedure as in Example 1 with the exception that the pH value of the slurry was adjusted to 8 before heat treatment.

Control 3

A catalyst for a fluidized bed use and having the empirical formula $Fe_{10}Sb_{25}Si_{30}O_{125}$ was prepared as follows:

(I) To 17.5 liters of nitric acid (specific gravity: 1.38) heated to about 80° C. there was slowly added 4.72 kg. of powdery metallic antimony below 100 microns in particle size. After completion of the oxidation of the antimony, excessive nitric acid was removed to obtain a nitric acid-oxidized antimony product, which was ground after washing with water in a colloid mill.
(II) To a mixture composed of 6.25 liters of nitric acid (specific gravity: 1.38) and 7.75 liters of water heated to about 80° C. there was slowly added 0.865 kg. of electrolytic iron powder and the resulting mixture was left to stand until the iron powder dissolved completely.

Products (I) and (II) were mixed together and to the mixture was slowly added 15 wt. percent aqueous ammonia while stirring, so as to adjust the pH of the mixture to 2.0.

The slurry, containing iron-antimony oxides, was heated at 100° C. for 2 hours while stirring, and then added to 13.9 kg. of a silica sol having a silica content of 20% by weight ("Snow Tex O"). The resulting slurry mixture was treated three times with a homogenizer for homogenization thereof, and subjected to spray-drying.

Micro spherical particles thus obtained were heated gradually in an external heating type rotary furnace to a final temperature of 650° C. over a period of about 3 hours, and further in an electric furnace at 850° C. for 2 hours.

Control 4

A catalyst for fluidized bed use and having the empirical formula $Fe_{10}Sb_{25}Si_{30}O_{125}$ was prepared as follows:

To 18.9 liters of nitric acid (specific gravity 1.38) heated to about 80° C. there was slowly added 4.72 kg. of powdery metallic antimony which passed through an 80 mesh screen. After completion of the oxidation of the antimony there was added 6.26 kg. of ferric nitrate [$Fe(NO_3)_3 \cdot 9H_2O$], and the resulting mixture was evaporated almost to dryness.

To the solid product thus obtained there were added 9.28 kg. of a silica sol having a silica content of 30% by weight ("Ludox HS") and 10 liters of water, to which was slowly added 28 wt. percent aqueous ammonia while stirring to adjust the pH of the mixture to 8.0.

The precipitate thus obtained was recovered by filtering and washed with 180 liters of water to produce a cake, to which was added water in such an amount that the solids content of the resulting mixture was about 20% by weight. The mixture was treated with a homogenizer, and subjected to spray-drying.

Micro spherical particles thus obtained were heated at 120° C. for 15 hours, then at 430° C. for 24 hours and finally at 760° C. for 8 hours, respectively, for calcination.

Control 5

A catalyst for fluidized bed use and having the empirical formula $Fe_{10}Sb_{25}O_{65}$ was prepared by repeating the procedure of Example 1 except that no silica sol was used.

Control 6

A catalyst for fluidized bed use and having the empirical formula $Fe_{10}Sb_{25}Si_{30}O_{125}$ was prepared by repeating the procedure of Example 6 except that no heat treatment was applied to the slurry.

Control 7

A catalyst for fluidized bed use and having the empirical formula $Fe_{10}Sb_{14}Si_{20}O_{83}$ was prepared by repeating the procedure of Example 10 except that no heat treatment was applied to the slurry.

Control 8

A catalyst for fluidized bed use and having the empirical formula $Fe_{10}Sb_{60}Si_{100}O_{335}$ was prepared by repeating the procedure of Example 11 except that no heat treatment was applied to the slurry.

Control 9

A catalyst for fluidized bed use and having the empirical formula $U_{10}Sb_{40}Si_{50}O_{206.6}$ was prepared by the same procedure as in Example 12 except that no iron component was used (nitric acid corresponding to the nitrate value of the iron nitrate of Example 12 was incorporated instead).

Control 10

A catalyst for fluidized bed use and having the empirical formula $U_{10}Fe_2Sb_{40}Si_{50}O_{209.6}$ was prepared by repeating the procedure of Example 12 except that no heat treatment was applied to the slurry.

Control 11

A catalyst for fluidized bed use and having the empirical formula $Sn_{10}Sb_{60}Si_{100}O_{340}$ was prepared by repeating the procedure of Example 13 except that no iron component was used.

Control 12

A catalyst for fluidized bed use and having the empirical formula $Sn_{10}Fe_6Sb_{60}Si_{100}O_{349}$ was prepared by repeating the procedure of Example 13 except that no heat treatment was applied to the slurry.

Control 13

A catalyst for fluidized bed use and having the empirical formula $Cr_{10}Sb_{25}Si_{30}O_{125}$ was prepared in the same fashion as in Example 14 with the exception that no iron component was used.

Control 14

A catalyst for fluidized bed use and having the empirical formula $Cr_{10}Fe_1Sb_{25}Si_{30}O_{126.5}$ was prepared by repeating the procedure of Example 14 except that no heat treatment was applied to the slurry.

Control 15

A catalyst for fluidized bed use and having the empirical formula $Mn_{10}Sb_{25}Si_{30}O_{130}$ was prepared by repeating the procedure of Example 15 except that no iron component was used.

Control 16

A catalyst for fluidized bed use and having the empirical formula $Cu_{10}Fe_2Sb_{50}Si_{60}O_{233}$ was prepared by repeating the procedure of Example 16 except that no heat treatment was applied to the slurry.

Control 17

A catalyst for fluidized bed use and having the empirical formula $V_{10}Sb_{50}Si_{60}O_{245}$ was prepared by repeating the procedure of Example 17 except that no iron component was used.

Control 18

A catalyst for fluidized bed use and having the empirical formula $W_{0.25}Te_{1.0}Fe_{10}Sb_{25}Si_{30}O_{127.8}$ was prepared by repeating the procedure of Example 18 with the exception that the pH of the conditioned slurry was 8.0.

Control 19

A catalyst for fluidized bed use and having the empirical formula $W_{0.5}P_{1.0}Fe_{10}Sb_{14}Si_{20}O_{87}$ was prepared by repeating the procedure of Example 19 except that no heat treatment was applied to the slurry.

Table 1 shows the strength of catalysts prepared in the foregoing examples and controls. Measurement of the strength was effected in accordance with the method described in "Test Methods for Synthetic Cracking Catalyst" 6/31-4m-1/57, published by American Cyanamid Co., and known to the art as a test method for fluid catalytic cracking catalysts, the so-called FCC-catalyst.

The test was conducted on catalyst particles ranging from 44 to 88 microns in size.

The R-value and I-value with respect to attrition loss (percent) given in Table I were calculated on the basis of the following equations:

$$R = B/(C-A) \times 100$$
$$I = A/C \times 100$$

wherein A represents the weight in grams of catalyst lost by attrition continued for a period of time from 0 to 5 hours, B represents the weight in grams of catalyst lost by attrition continued for a period of time of from 5 to 15 hours, and C represents the weight in grams of catalyst tested by the present test, C=50.

TABLE 1.—FLUID ATTRITION TEST

| Catalyst of Example No. | Attrition loss (percent) I | R | Control catalyst of control Example No. | Attrition loss (percent) I | R |
|---|---|---|---|---|---|
| 1 | 2.0 | 0.8 | 1 | 60.1 | 34.1 |
| 2 | 2.1 | 1.1 | 2 | 8.2 | 4.8 |
| 3 | 2.5 | 0.4 | 3 | 25.3 | 18.2 |
| 4 | 0.8 | 0.3 | 4 | 15.3 | 5.4 |
| 5 | 3.1 | 1.0 | 5 | (¹) | (¹) |
| 6 | 2.2 | 0.7 | 6 | 40.1 | 20.4 |
| 7 | 2.0 | 0.5 | 7 | 50.6 | 21.5 |
| 8 | 1.9 | 0.5 | 8 | 35.2 | 20.4 |
| 9 | 2.8 | 1.2 | 9 | 15.1 | 5.01 |
| 10 | 2.3 | 1.4 | 10 | 45.0 | 20.1 |
| 11 | 2.1 | 1.4 | 11 | 13.2 | 6.5 |
| 12 | 3.5 | 2.1 | 12 | 30.2 | 18.1 |
| 13 | 3.0 | 1.8 | 13 | 12.0 | 6.2 |
| 14 | 3.8 | 1.7 | 14 | 40.8 | 13.4 |
| 15 | 4.5 | 2.2 | 15 | 14.3 | 7.4 |
| 16 | 2.5 | 1.1 | 16 | 50.2 | 21.5 |
| 17 | 3.9 | 1.4 | 17 | 25.0 | 28.3 |
| 18 | 1.8 | 10 | 18 | 8.5 | 4.7 |
| 19 | 1.0 | 0.2 | 19 | 38.1 | 20.4 |

¹ Not measurable, very soft (weak).

Catalysts prepared in accordance with the present invention are very suitable for use in the production of acrylonitrile, methacrylonitrile, acrolein, methacrolein, butadiene-1,3 and the like, due to their high degree of catalytic activities as well as their high attrition resistance.

What is claimed is:

1. A process for preparing an attrition-resistant, solid catalyst containing antimony oxide, suitable for use in a fluidized bed, which comprises the steps of
   (1) preparing a slurry containing, as essential ingredients, a trivalent antimony compound, at least one polyvalent metal compound, a silica sol, a ferric compound and nitrate ions,
   (2) adjusting the pH of said slurry to a value below about 7,
   (3) subjecting said slurry to heat treatment at a temperature of from about 40° C. to about 150° C. for at least about 20 minutes, while maintaining said slurry in a slurried state,
   (4) spray-drying the heat-treated slurry to form microspherical catalyst particles, and
   (5) calcining the resulting particles at a temperature of from about 400° C. to about 1100° C.

2. The process of claim 1 wherein the polyvalent metal compound is selected from the group consisting of iron, cobalt, nickel, tin, uranium, chromium, copper, manganese, titanium, vanadium, molybdenum, tungsten, tellurium, bismuth, arsenic, thorium and cerium.

3. The process of claim 2 wherein the polyvalent metal:antimony atomic ratio is from about 1:10 to about 5:1.

4. The process of claim 2 wherein the polyvalent metal:antimony ratio is from about 1:5 to 1:1.

5. The process of claim 1 wherein the trivalent antimony compound is selected from the group consisting of nitric acid-oxidized antimony, antimony trihalide, antimony oxyhalide, antimony trioxide and hydrated trivalent antimony oxide.

6. The process of claim 1 wherein the trivalent antimony compound is nitric acid-oxidized antimony, obtained by oxidizing powdered metallic antimony with nitric acid at a temperature of from about 80° C. to about 120° C.

7. The process of claim 6 wherein, before use, the nitric acid-oxidized antimony is finely divided by mechanical means.

8. The process of claim 6 wherein, before use, the nitric acid-oxidized antimony is at least partially hydrolized, to finely divide the antimony trioxide, by immersion into a medium selected from the group consisting of water and aqueous ammonia.

9. The process of claim 8 wherein the water employed is boiling water.

10. The process of claim 1 wherein said ferric compound and nitrate ions are present in the slurry during said heat treatment in an amount of at least about 1 gram mole of the ferric compound, and from about 1 to about 2,000 gram ions of the nitrate ion, respectively, per 100 gram atoms of antimony present.

11. The process of claim 1 wherein said ferric compound and nitrate ions are present in the slurry during said heat treatment in an amount of at least 5 gram moles of the ferric compound and from about 50 to about 2,000 gram ions of the nitrate ions, respectively, per 100 gram atoms of antimony present.

12. The process of claim 1 wherein the silica sol is an aqueous silica sol which contains from about 5 to about 90% by weight of silica.

13. The process of claim 12 wherein said aqueous silica sol contains from about 10 to about 50% by weight of silica.

14. The process of claim 1 wherein the pH of the slurry is adjusted in step (2) to a value of from about 1 to about 4.

15. The process of claim 14 wherein the pH is adjusted with a member selected from the group consisting of nitric acid, gaseous ammonia, aqueous ammonia, and combinations thereof.

16. The process of claim 1 wherein the heat-treatment of the slurry is carried out at a temperature of from about 80° C. to about 100° C. for about 1 to 12 hours.

17. The process of claim 1 wherein the slurry just prior to said heat treatment contains from about 0.5 to about 50% by weight of solids calculated as oxides of the elements present in the slurry and which comprise the resulting catalyst.

18. The process of claim 1 wherein, prior to said heat treatment, ammonium nitrate is added to the slurry, in addition to any already present.

19. The process of claim 18 wherein the additional ammonium nitrate is added to the slurry in an amount of from about 1 to 30% based on the weight of solids in the slurry.

20. The process of claim 1 wherein, prior to said heat treatment, a member selected from the group consisting of nitrous acid and a nitrite salt, is added to the slurry in addition to those produced in the slurry during the heat treatment.

21. The process of claim 20 wherein the nitrite salt is ammonium nitrite.

22. The process of claim 1 wherein the slurry after said heat treatment and prior to said spray-drying, contains from about 10 to 40% by weight of solids, calculated as oxides of the elements comprising the resulting catalyst.

23. The process of claim 1 wherein the slurry, prior to spray-drying, is subjected to homogenization.

24. The process of claim 1 wherein the calcining step is carried out in a non-reducing atmosphere.

25. The process of claim 1 wherein the calcining step is carried out in two stages, consisting of pre-calcination at a temperature of from about 350° C. to about 600° C. and final calcination at a temperature of from about 600° C. to about 1,100° C.

26. The process of claim 21 wherein at least one of the calcination stages is carried out in a fluidized bed furnace.

27. An attrition resistant catalyst produced by the process of claim 1.

28. The attrition resistant catalyst of claim 27 wherein said catalyst contains from about 10 to about 90% by weight of silica.

29. The attrition resistant catalyst of claim 27 wherein more than about 80% by weight of the catalyst particles have sizes in a range of from about 5 to 100 microns.

30. The process of claim 1, wherein said heat treatment of step (3) ranges from about 1 hour to about 12 hours.

31. The process of claim 1, wherein the temperature of said heat treatment of step (3) ranges from 80° C. to 100° C.

References Cited

UNITED STATES PATENTS

| | | | |
|---|---|---|---|
| 3,197,419 | 7/1965 | Callahan et al. | 252—456 |
| 3,198,751 | 8/1965 | Bethell et al. | 252—456 X |
| 3,338,952 | 8/1967 | Callahan et al. | 252—456 X |
| 3,341,471 | 9/1967 | Callahan et al. | 252—456 X |
| 3,445,521 | 5/1969 | Callahan et al. | 252—456 X |
| 3,525,701 | 8/1970 | Barclay et al. | 252—454 X |

DANIEL E. WYMAN, Primary Examiner

W. J. SHINE, Assistant Examiner

U.S. Cl. X.R.

252—454, 458, 459